UNITED STATES PATENT OFFICE.

LEMUEL PAGIN, OF NILES, MICHIGAN.

IMPROVEMENT IN COMPOUNDS FOR DESTROYING POTATO-BUGS.

Specification forming part of Letters Patent No. 112,732, dated March 14, 1871.

*To all whom it may concern:*

Be it known that I, LEMUEL PAGIN, of Niles, in the county of Berrien and State of Michigan, have invented a new and useful Compound for Destroying Potato-Bugs; and I do hereby declare that the following is a full, clear, and exact description thereof, which will enable others skilled in the art to compound and use the same, reference being had to the following ingredients and their proportions as the whole is hereinafter fully set forth.

I use of paris-green, two pounds; pulverized resin, two and a half pounds; gum-arabic or slippery elm, one-fourth pound, or one-eighth pound each of the gum-arabic and slippery elm; wheat flour, five pounds; all of which are finely ground, and then put into a suitable pan or receptacle and thoroughly incorporated.

The compound thus prepared is then thoroughly mixed with one bushel of middlings. This is readily done after the resin, paris-green, and gum-arabic have been incorporated with the fine flour. The paris-green, however, being a very heavy substance, cannot well be evenly mixed with any coarse substance, unless first incorporated with that which is fine.

My method of applying the compound consists in scattering upon potato-vines with what is known as a dust-sprinkler in regions where the potato-bug infests vines.

I usually commence to use the compound on the vines when very small, if the bugs make their appearance, and continue to use it from time to time until the crop is quite well grown; by so doing, the bugs are kept from doing any considerable injury, while at the same time not so much compound is required.

The above proportions are given from a practical test, and are known to be effectual; but the proportions may be changed and yet allow the compound to be efficient, as will be seen from what follows:

In the foregoing statement, two pounds are used of paris-green, but that amount in the compound is only required when old bugs are to be killed—one pound and a half being sufficient to the other ingredients for killing young bugs.

It is well understood that the only ingredient in the compound which kills the bugs is the paris-green, the other articles being employed simply as a medium to apply the paris-green and hold it on the vines. The flour and middlings are the principal substances for increasing the bulk, so that the paris-green may be used to profit and advantage, and the gum-arabic, resin, and slippery elm for giving the compound a sticky consistency when coming in contact with moisture. The resin, being insoluble, aids materially in forming a cement, while at the same time it prevents the paris-green from being taken up by the juice of the vines and injuring them. It also prevents what compound falls on the ground from being taken up by the growing potatoes and poisoning them.

If the compound is applied in the morning or evening, the dew will dissolve the gum-arabic or slippery elm, so as to form a coating on the vines which will last for weeks without producing any permanent injury, as is the case when paris-green is used by itself, or with plaster-of-paris, or other similar substance, as is customary.

Another advantage of the compound consists in the bugs eating it for what starch and saccharine matter is formed therein. In doing that they get more or less paris-green and are killed.

When the compound is prepared and used as set forth it forms a firm coating, which rain will not wash off, and which, while it does not cover so much of the stalks and leaves as to prevent the vines from receiving their usual supply of nourishment from the atmosphere, it is a sure protection if properly used.

Having thus described my invention, what I claim, and desire to secure by Letters Patent, is—

1. The combination of the fine flour and middlings with the paris-green, for the convenience of scattering the paris-green evenly over the vines, as set forth.

2. The combination of all the ingredients herein named, compounded as and for the purpose herein described.

LEMUEL PAGIN.

Witnesses:
CYRUS M. ALWARD,
S. P. L. HUNSTABLE.